(12) United States Patent
Lu et al.

(10) Patent No.: US 7,818,814 B2
(45) Date of Patent: Oct. 19, 2010

(54) METHOD FOR DISTRIBUTING SOFTWARE BASED ON SOFTWARE PROTECTION DEVICES

(76) Inventors: Zhou Lu, Bldg 7A, 5th Floor, No. 40 Xueyuan Road, Haidian District, Beijing (CN); Fan Chen, Bldg 7A, 5th Floor, No. 40 Zueyuan Road, Haidian District, Beijing (CN)

(*) Notice: Subject to any disclaimer, the term of this patent is extended or adjusted under 35 U.S.C. 154(b) by 969 days.

(21) Appl. No.: 11/534,909

(22) Filed: Sep. 25, 2006

(65) Prior Publication Data
US 2007/0136822 A1 Jun. 14, 2007

(51) Int. Cl.
*G06F 7/04* (2006.01)

(52) U.S. Cl. ......................................... 726/27

(58) Field of Classification Search .................. 726/28, 726/26, 27; 713/168, 173, 192; 705/51, 705/59
See application file for complete search history.

(56) References Cited

U.S. PATENT DOCUMENTS 7,272,858 B2 * 9/2007 Parks et al. ................... 726/28
2003/0212639 A1 * 11/2003 Cronce et al. ................. 705/57

* cited by examiner

*Primary Examiner*—Michael Pyzocha
*Assistant Examiner*—Ali S Abyaneh
(74) *Attorney, Agent, or Firm*—Husch Blackwell Welsh Katz

(57) ABSTRACT

The present invention relates to a method for distributing software, more particularly, to a method for distributing software based on software protection devices. Said software includes an upgrade program that is extracted from the software and placed into a user software protection device, and a protected program retained after the upgrade program is extracted from the software. Said protected program, upgrade program (which will be placed into the user software protection device), and the user software protection device are delivered to the user respectively. Then said protected program and upgrade program are installed and run jointly using leasehold information. Therefore, the software distribution process is protected and managed reliably, the developer's software distribution process is streamlined, the security of software protection is increased, the developer's development cost is reduced, and the usability of the software protection device is increased as well. Moreover, said protected program and upgrade program can be delivered through network so that the distribution cost can also be reduced.

10 Claims, 1 Drawing Sheet

METHOD FOR DISTRIBUTING SOFTWARE BASED ON SOFTWARE PROTECTION DEVICES

BACKGROUND OF THE INVENTION

1. Field of the Invention

The present invention relates to a method for distributing software and, more particularly, to a method for distributing software based on software protection devices.

2. State of the Art

The rapid development of software industry has greatly improved social productivity in recent years, but the accompanying software piracy technologies become the biggest obstacle for the industry. Currently, hardware based software protection is a leading technology to provide highly secured software protection. However, because the software protection devices are concrete and there are disadvantages in the current software distribution methods, the development of the software protection technology using software protection devices is hampered.

Currently, the software and the upgrade programs based on software protection devices are distributed in the following way: a) first the software developer purchases software protection devices and software development kits or tools; b) then the software developer uses the software development kits or tools to program on the software protection devices, so that the protected software cannot work without the software protection devices; c) finally the software developer delivers the protected software together with the software protection device to each end user.

There are several disadvantages in this distribution mode: 1) the software developer has to pay for the cost of software protection devices on top of the cost of developing the software; 2) unlike the software, the software protection devices cannot be directly delivered via the Internet, which makes the selling channel more complex; 3) One software protection device can match only one kind of software, the users may end up having many software protection devices, which may result in inconvenience of use and waste of resources.

SUMMARY OF THE INVENTION

The present invention seeks to provide a method for distributing software based on software protection devices in a simple, convenient, and efficient way.

The solution of the present invention is:

Said software includes an upgrade program that is extracted from the software and placed into a user software protection device, and a protected program retained after the upgrade program is extracted from said software; Said protected program, upgrade program which will be placed into the user software protection device, and the user software protection device are delivered to the user respectively. Said upgrade program is loaded into said software protection device based on leasehold information. Said method comprises the following steps:

1) A software developer requests the license to use the user software protection device from a hardware manufacturer, said hardware manufacturer provides said software developer with developer software protection device and the leasehold information, and said developer software protection device contains pre-set encryption algorithms;

2) The user obtains the user software protection device and the protected program respectively, and said user software protection device contains pre-set decryption algorithms;

3) The user retrieves the characteristic information of both the hardware and the protected program, builds a characteristic information packet, and sends the packet to said software developer;

4) Said software developer sends a verification packet back to the user, which contains said upgrade program, the characteristic information of the user software protection device, and said leasehold information, and said verification packet is encrypted using the encryption algorithms in said developer software protection device;

5) Said user decrypts the verification packet sent by the software developer using the decryption algorithms in said user software protection device, and saves the upgrade program into said user software protection device.

At step 2) the user may provide said software developer with her/his characteristic information before s/he receives the protected program; At step 3) the characteristic information packet also contains the said user characteristic information; At step 4) the said software developer verifies the user against said user characteristic information.

Said leasehold information may contain space allocation information in said user software protection device, which controls space allocation for said upgrade program in said user software protection device.

Said space allocation information contains the size, location and identifier of the storage space in the said user software protection device, which are used to calculate and allocate the location and space for the operation of said upgrade program in said user software protection device.

Said pre-set encryption algorithms in the developer software protection device and pre-set decryption algorithms in the user software protection device are owned by the hardware manufacturer. They are reverse algorithms to each other.

The information exchange between the software developer and the user is implemented via data transmission over the network in said steps 2), 3), 4) and 5).

Said software in present invention includes an upgrade program that is extracted from the software and placed into a user software protection device, and a protected program retained after the upgrade program is extracted from the software. Said protected program, upgrade program (which will be placed into the user software protection device), and the user software protection device are delivered to the user respectively. Then said protected program and upgrade program are installed and run jointly using the leasehold information. The benefits resulting from the present invention are:

1. The software distribution process can be protected and managed reliably, and the distribution of software protection devices is easier. The software developer can distribute the protected program and the upgrade program via post mail or sales agents or via the Internet directly. The hardware devices used for software protection can be delivered to users from the hardware manufacturer directly. Therefore, the software distribution process is streamlined and the security of software protection is increased.

2. The software developer no longer needs to purchase a software protection device for each suite of software when publishing it, so that the development cost is reduced. Moreover, because said protected program and upgrade program may be distributed through the network, the distribution cost can be reduced as well.

3. The user can run multiple software products with only one software protection device, and the use of software protection devices is more convenient too. As a result, the utilization efficiency of software protection devices is improved.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
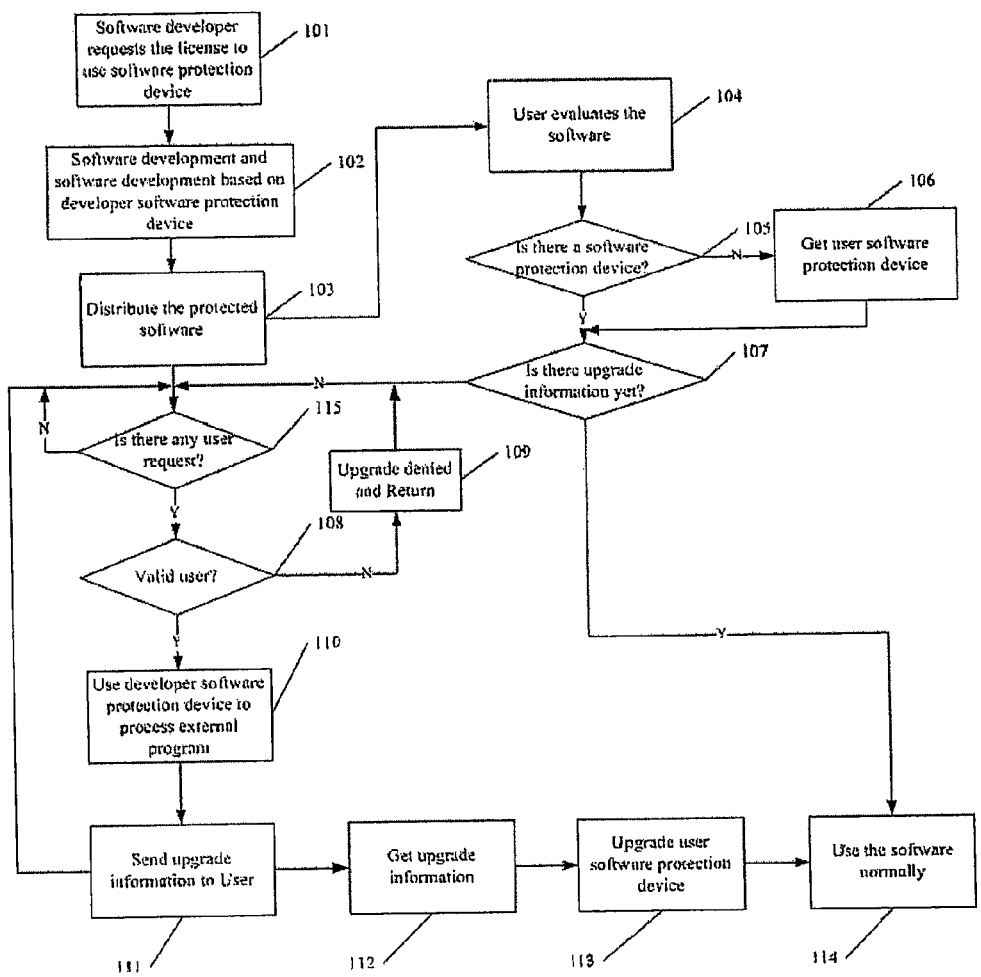
FIG. 1 is a flow diagram of the process of the present invention.

The present invention will be further described from the embodiments below. As shown in FIG. 1, the present invention can be embodied with the following processes:

1. The software developer requests the license to use the software protection device from the hardware manufacturer.

The software developer requests the license to use the software protection device from the hardware manufacturer and provides necessary characteristic information, including the allocated space size of each encryption program in the software protection device. Then the hardware manufacturer grants the license to the software developer, and provides the developer with the software development kits and the developer software protection device containing leasehold information, if the request is approved. The software developer then develops software protection module based on said leasehold information and the developer software protection device. The detailed process includes:

1) During the software development, the software developer requests the license to use the software protection device from the hardware manufacturer, as shown in Step 101. If the request is approved, the software developer will receive a developer software protection device and a software development kit. The developer software protection device contains unique certification information of the software developer, i.e. the developer leasehold information. Said leasehold information includes characteristic information of the software developer and the space allocation information for allocating the storage and operating space to the upgrade program.

2) The software developer develops software using the software development kit, as shown in Step 102. At the end of the software development, the developer adds a secured point to the formal or trial edition of the software to be distributed, and extracts the protected portion from the software as the upgrade program to be run in the software protection device. After that, the developer distributes the protected software to the user directly or through a channel partner, as shown in Step 103, and waits for the user to request for the upgrade program, as shown in Step 115.

3) The software developer develops the protected portion using the software development kit, and converts the code or the instruction set of the extracted upgrade program to produce the upgrade program to be run in the software protection device.

4) The user purchases the software and requests the using of said upgrade program from the software developer. The end user can evaluate the software after the software is purchased from the hardware agents or from the software developer directly, as shown in Step 104. However, the software cannot work normally at this point, because some key features have not been installed yet, i.e. a software protection device is required. As shown in Step 105, if the user already has a software protection device, the software protection device may be used. But if the device has reached its maximum capacity, or the user does not have a device at all, getting a user software protection device from the hardware manufacturer or one of its hardware agents is necessary, as shown in Step 106. It is possible that the user uses the software protection device to run multiple programs from various software developers, depending on how the hardware manufacturer operates.

2. When the user purchases the license to use the software from said developer, it is required to provide the user's characteristic information, such as the ID number or other unique identification information. First, the software developer distributes the protected program through the network. As shown in Step 107, upon receiving the protected program from the software developer, the user determines there is no upgrade information yet, the user will initialize said protected program immediately, or do the initialization after a trial period of time during said initialization, the user will extract the characteristic information from said protected program, and the hardware characteristic information from said user software protection device, build a characteristic information packet with the above characteristic information and the user's characteristic information, then send it to said software developer through the network. Said hardware characteristic information may be the serial number or other unique characteristic information of said software protection device.

3. The software developer verifies the user against the characteristic information packet sent by the user, encrypts the upgrade program with said developer software protection device, and builds a verification packet to send back to the user:

First, the software developer verifies the user against the characteristic information of the protected program and the characteristic information of the user to determine the user's validity and the software version, as shown in Step 108. Second, the software developer encrypts the hardware characteristic information of the user software protection device sent by the valid user, the upgrade program to be run in said software protection device, and the leasehold information in said developer software protection device using the encryption algorithms preset in said developer software protection device to generate cipher text, which is the verification packet that will be delivered to the user, as shown in Step 110. If the user is valid, as shown in Step 109, then return to Step 108. Finally, the software developer will send said verification packet to the user through the network, as shown in Step 111.

4. The user decrypts said verification packet by using the user software protection device s/he has, and loads said upgrade program into said software protection device.

As shown in Step 112, upon receiving said verification packet which contains the upgrade information sent by the software developer, the user decrypts said verification packet using the decryption algorithms from the user software protection device provided by the hardware manufacturer to get hardware characteristic information, leasehold information and the upgrade program. If this hardware characteristic information matches the hardware characteristic information from the user, the user can restore the upgrade program correctly. Then the upgrade program from the software developer can be stored or installed in user software protection device, as shown in Step 113. After this step, the user can run and use the complete software from the developer correctly, as shown in Step 114.

Said encryption algorithms in the developer software protection device and said decryption algorithms in the user software protection device are mutually reversible. These algorithms are pre-set in the devices prior to the delivery. Therefore, they are solely held by the hardware manufacturer. Any invalid users cannot obtain the correct upgrade program from the hardware characteristic information in said user software protection device and said verification packet. Under this mode, said upgrade program is reliably protected, thereby to ensure that the software including the protected program and the upgrade program is unique. As a result, the software developer's interests are protected.

The space allocation information in said leasehold information is used to allocate the space for storing and operating the upgrade program in the user software protection device. Said leasehold information from the software developer includes space allocation information and the developer's characteristic information. The space allocation information includes space size, space location, and space identifier. The space identifier may be a serial number, or a filename or file ID of a file system. Considering that the software protection device from one hardware manufacturer might be used for the software developed by various developers, each developer may have many end users, and one software protection device can be used only by one user, it is possible that one user software protection device is used for many kinds of software of various developers. Thus the amount of software protected by all the user software protection devices will be unlimited. Consequently, it is necessary to allocate the space in user software protection device using said space allocation information to determine, for example, allocated storage space and operation space according to the size of the upgrade program, or the location of the upgrade program according to the location information. The space identifier in said leasehold information can be used to allocate the space locations to store and operate various upgrade programs for the same software. The allocation algorithm may be similar to the file allocation algorithm of the file system in PC, or the location algorithm for space arrangement.

In addition, with this space allocation, multiple upgrade programs for multiple protected programs from various software developers can be operated in the same user software protection device synchronously. In this way, a user does not need to install several software protection devices to run different software at the same time, therefore the process is simplified and the resource is saved.

The software developer's leasehold characteristic information, which is generated when the software developer requests the license to use the software protection device, is the basis of both encrypting using the developer software protection device and decrypting using the user software protection device. It can include the space size, space location, and space identifier. After encrypting the upgrade program using the developer software protection device, this characteristic information will be contained in the verification packet. And after decrypting using the user software protection device, the leasehold characteristic information that is identical to said developer leasehold information and the upgrade program is generated and restored in the user software protection device. Therefore, even the user runs programs from several software developers, the user can still use only one user software protection device to run multiple programs from various developers, because the hardware manufacturer has allocated different space size, space location and space identifier to each software developer.

Moreover, the user software protection device may be different from the developer software protection device, or it is the same hardware as the developer software protection device with different authorization. The hardware manufacturer may set different authorization levels in said software protection devices for different users and developers.

In said steps, data is transmitted through the network, which reduces the distribution cost and distribution cycle, hence streamlines the distribution process. The encrypting and decrypting operations by using said developer software protection device and said user software protection device in combination with said leasehold information and said hardware characteristic information secure software distribution process and ensure the uniqueness of the user who purchases and uses the software, so that the software developer's interests are protected. In addition, the software developer can also obtain a unique developer characteristic information to identify itself and the information can be contained in said leasehold information when the software developer requests the license to use the software protection devices from the hardware manufacturer.

The method for distributing software based on software protection devices, which is provided by the present invention, is described in details above. It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for distributing software to a user based on software protection devices, wherein said software includes an upgrade program that is extracted from the software and placed into a user software protection device, and a protected program retained after said upgrade program is extracted from the software by a software developer; said protected program, upgrade program, and the user software protection device are delivered to the user respectively; and said upgrade program is loaded into said software protection device based on leasehold information; and the method comprising the following steps:

a) A software developer requests a license to use the user software protection device from a hardware manufacturer, said hardware manufacturer grants the license to the software developer and provides said software developer with the developer software protection device and leasehold information based upon the granted license, and said developer software protection device contains pre-set encryption algorithms;

b) The software developer develops the upgrade program to run in the user software protection device;

c) The user obtains the user software protection device and the protected program respectively, and said user software protection device contains pre-set decryption algorithms;

d) The user retrieves hardware characteristic information of the user software protection device and characteristics of the protected program, builds a characteristic information packet, and sends the packet to said software developer;

e) Said software developer sends a verification packet back to the user, which contains said upgrade program, the characteristic information of the user software protection device, and said leasehold information, and said verification packet is encrypted using the encryption algorithms in said developer software protection device;

f) Said user decrypts the verification packet sent by the software developer using the decryption algorithms in said user software protection device, and saves the upgrade program into said user software protection device.

2. The method according to claim 1, wherein in said Step c, the user provides said software developer with the user's characteristic information when the user obtains the protected program; in said Step d, said user's characteristic information is also contained in the characteristic information packet; and in said Step e, said software developer verifies the user against said user's characteristic information.

3. The method according to claim 2, wherein said leasehold information contains space allocation information of said user software protection device, which controls space allocation for said upgrade program in said user software protection device.

4. The method according to claim 3, wherein said space allocation information contains the space size, space location and space identifier in said user software protection device, and the space allocation information is used to calculate and allocate the location and operating space of said upgrade program in said user software protection device.

5. The method according to claim 2, wherein said pre-set encryption algorithms in the developer software protection device and said pre-set decryption algorithms in the user software protection device are held by the hardware manufacturer, and the encryption algorithms and the decryption algorithms are mutually reversible.

6. The method according to claim 2, wherein the information exchange of the protected program and the upgrade program between the software developer and the user is implemented via data transmission over the network.

7. The method according to claim 1, wherein said leasehold information contains space allocation information of said user software protection device, which controls space allocation for said upgrade program in said user software protection device.

8. The method according to claim 7, wherein said space allocation information contains the space size, space location and space identifier in said user software protection device, and the space allocation information is used to calculate and allocate the location and operating space of said upgrade program in said user software protection device.

9. The method according to claim 1, wherein said pre-set encryption algorithms in the developer software protection device and said pre-set decryption algorithms in the user software protection device are held by the hardware manufacturer, and the encryption algorithms and the decryption algorithms are mutually reversible.

10. The method according to claim 1, wherein the information exchange of the protected program and the upgrade program between the software developer and the user is implemented via data transmission over the network.

* * * * *